US012250266B2

(12) United States Patent
Thiruveedula et al.

(10) Patent No.: US 12,250,266 B2
(45) Date of Patent: Mar. 11, 2025

(54) SYSTEMS AND METHODS FOR AUTOMATED DEPLOYMENT OF LOAD-BALANCED SERVICES IN A CONTAINERIZED ENVIRONMENT

(71) Applicant: Verizon Patent and Licensing Inc., Basking Ridge, NJ (US)

(72) Inventors: Bharath Thiruveedula, Irving, TX (US); John M. Bittenbender, Bloomsburg, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 277 days.

(21) Appl. No.: 18/145,114

(22) Filed: Dec. 22, 2022

(65) Prior Publication Data
US 2024/0214448 A1 Jun. 27, 2024

(51) Int. Cl.
*H04L 67/1014* (2022.01)
*H04L 67/101* (2022.01)
*H04L 67/56* (2022.01)

(52) U.S. Cl.
CPC ........ *H04L 67/1014* (2013.01); *H04L 67/101* (2013.01); *H04L 67/56* (2022.05)

(58) Field of Classification Search
CPC .... H04L 67/1014; H04L 67/56; H04L 67/101
See application file for complete search history.

(56) References Cited

U.S. PATENT DOCUMENTS

| | | | |
|---|---|---|---|
| 2019/0335004 A1* | 10/2019 | Yang | G06F 8/316 |
| 2020/0314015 A1* | 10/2020 | Mariappan | G06F 9/45558 |
| 2020/0412651 A1* | 12/2020 | Patidar | H04L 63/0471 |

OTHER PUBLICATIONS

"Service Mesh for Apps in ContainerEnvironments," F5 Networks, Inc., available at https://www.f5.com/pdf/products/application-services-proxy-datasheet.pdf (2017).
"Service Proxy for Kubernetes > Overview," F5 Networks, Inc., available at https://clouddocs.f5.com/service-proxy/latest/intro.html (visited Nov. 28, 2022).

(Continued)

*Primary Examiner* — Suraj M Joshi

(57) ABSTRACT

A system described herein may receive a request to configure a load-balanced service in a containerized environment. The system may include an indication of a particular network with which the load-balanced service should communicate. The system may generate a load balancer proxy node. Generating the load balancer proxy node may include associating the load balancer proxy node with a first interface associated with the particular network and with a second interface associated with the containerized environment. The system may generate a set of service node instances, which may include associating the set of service node instances with a third interface associated with the containerized environment. The system may associate the second interface with the third interface and may deploy, in response to the request, the set of load balancer proxy node instances and the set of service node instances to the containerized environment.

20 Claims, 12 Drawing Sheets

(56) References Cited

OTHER PUBLICATIONS

"Service Proxy for Kubernetes > Networking Overview," F5 Networks, Inc., available at https://clouddocs.f5.com/service-proxy/latest/spk-network-overview.html (visited Nov. 28, 2022).
"Service Proxy for Kubernetes > TMM Resources," F5 Networks, Inc., available at https://clouddocs.f5.com/service-proxy/latest/spk-tmm-resources.html (visited Nov. 28, 2022).
"Service Proxy for Kubernetes > Service Proxy for Kubernetes," F5 Networks, Inc., available at https://clouddocs.f5.com/service-proxy/latest/spk-bgp-overview.html (visited Nov. 28, 2022).
"Virtual Route Forwarding Design Guide for VRF-Aware Cisco Unified Communications Manager Express," Cisco Systems, Inc., available at https://www.cisco.com/c/en/us/td/docs/voice_ip_comm/cucme/vrf/design/guide/vrfDesignGuide.pdf (2008).
"Installing Helm v3.1.0," Helm, available at https://helm.sh/docs/intro/install/, visited Dec. 16, 2022 (2022).

* cited by examiner

SYSTEMS AND METHODS FOR AUTOMATED DEPLOYMENT OF LOAD-BALANCED SERVICES IN A CONTAINERIZED ENVIRONMENT

BACKGROUND

Wireless networks or other systems may make use of containerized environments, which may include nodes that are implemented by virtual machines, cloud systems, bare metal devices, etc. Containerized processes, or containers, may be instantiated on the nodes. In the context of a software-defined network ("SDN"), the containers may implement one or more network functions of the SDN. Some network functions may be installed in a redundant fashion, such as by multiple instances of the same network function.

DETAILED DESCRIPTION OF EXAMPLE EMBODIMENTS

The following detailed description refers to the accompanying drawings. The same reference numbers in different drawings may identify the same or similar elements.

Embodiments described herein provide for the automated deployment of a requested set of nodes in a containerized environment, as well as one or more load balancers for the requested set of nodes. As such, in accordance with some embodiments, a user, application, etc. may be able to deploy a robust, multi-node instance set of services with appropriate load balancing and/or routing between multiple node instances without the need for manually configuring a load balancer and/or communications between the load balancer and the node instances. As such, the procedure for deployment a load-balanced set of services in a containerized environment may be streamlined and simplified, and may reduce or eliminate considerable amounts of manual configuration needed in order to effectuate such deployment.

Figure 1:
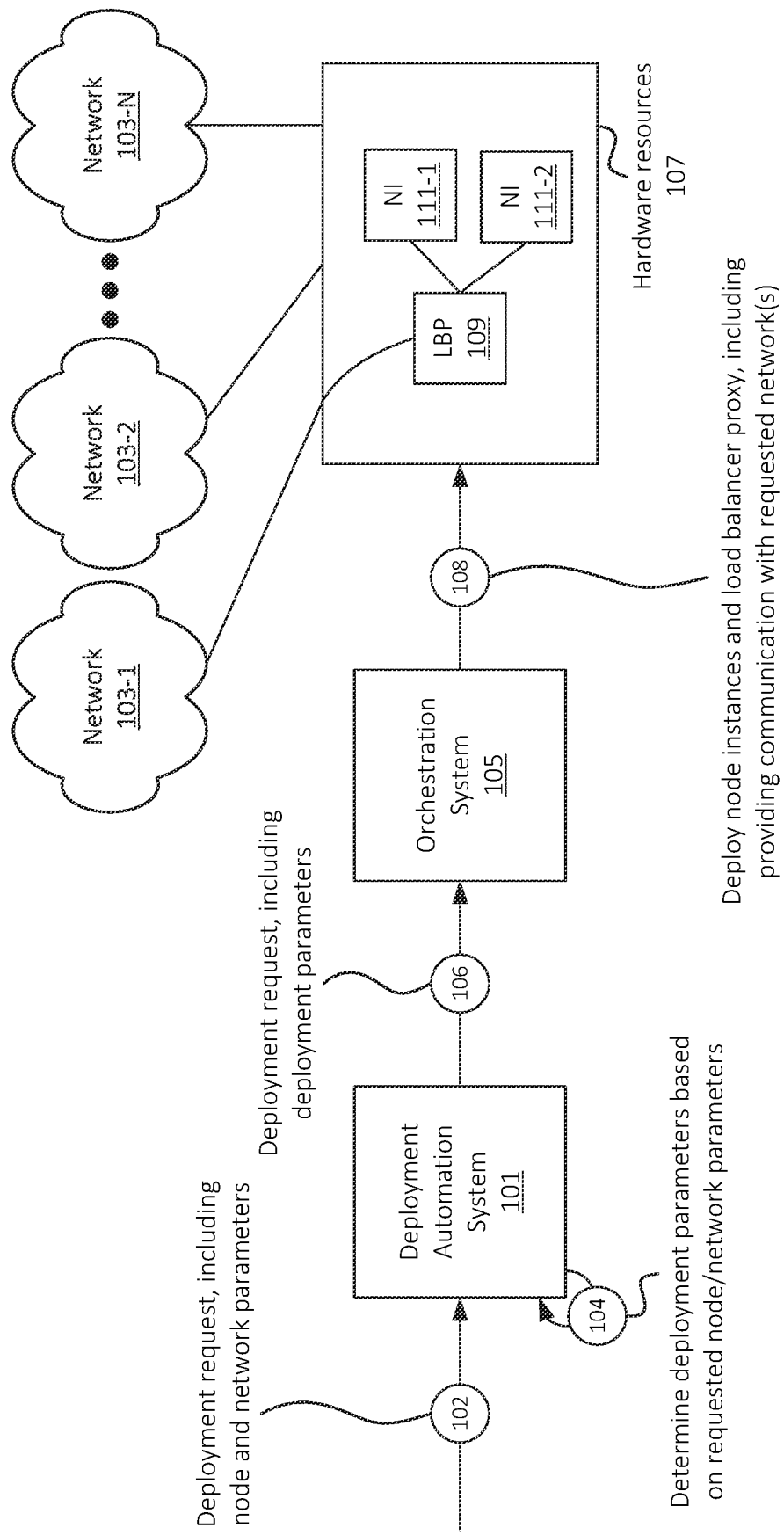
FIG. 1 illustrates an example overview of one or more embodiments described herein.

As shown in FIG. 1, for example, Deployment Automation System ("DMAS") 101 may receive (at 102) a deployment request, including node and network parameters. For example, in some embodiments, DMAS 101 may be associated with an application programming interface ("API"), a web portal, and/or some other suitable communication pathway via which a user, an application, a device or system, and/or some other entity may provide (at 102) the request to DMAS 101.

The deployment request may be associated with, for example, an instantiation or deployment of a network function, one or more images or containers, an application suite, etc. The node parameters may include, for example, a quantity of node instances requested for the deployment. The requestor may request multiple instances of the same network function, image, container, etc. in order for robustness and availability (e.g., where one instance may serve as a backup if another instance fails), to accommodate an expected level of demand, to serve multiple geographical locations (e.g., where different instances are deployed in diverse geographical regions), and/or for other reasons.

In some embodiments, the deployment request may specify one or more networks with which the requested node instances should be able to communicate. As discussed below, different networks may be available for communication, such as one or more private networks, the Internet, a core network of a wireless network, and/or some other type of network.

Figure 2:
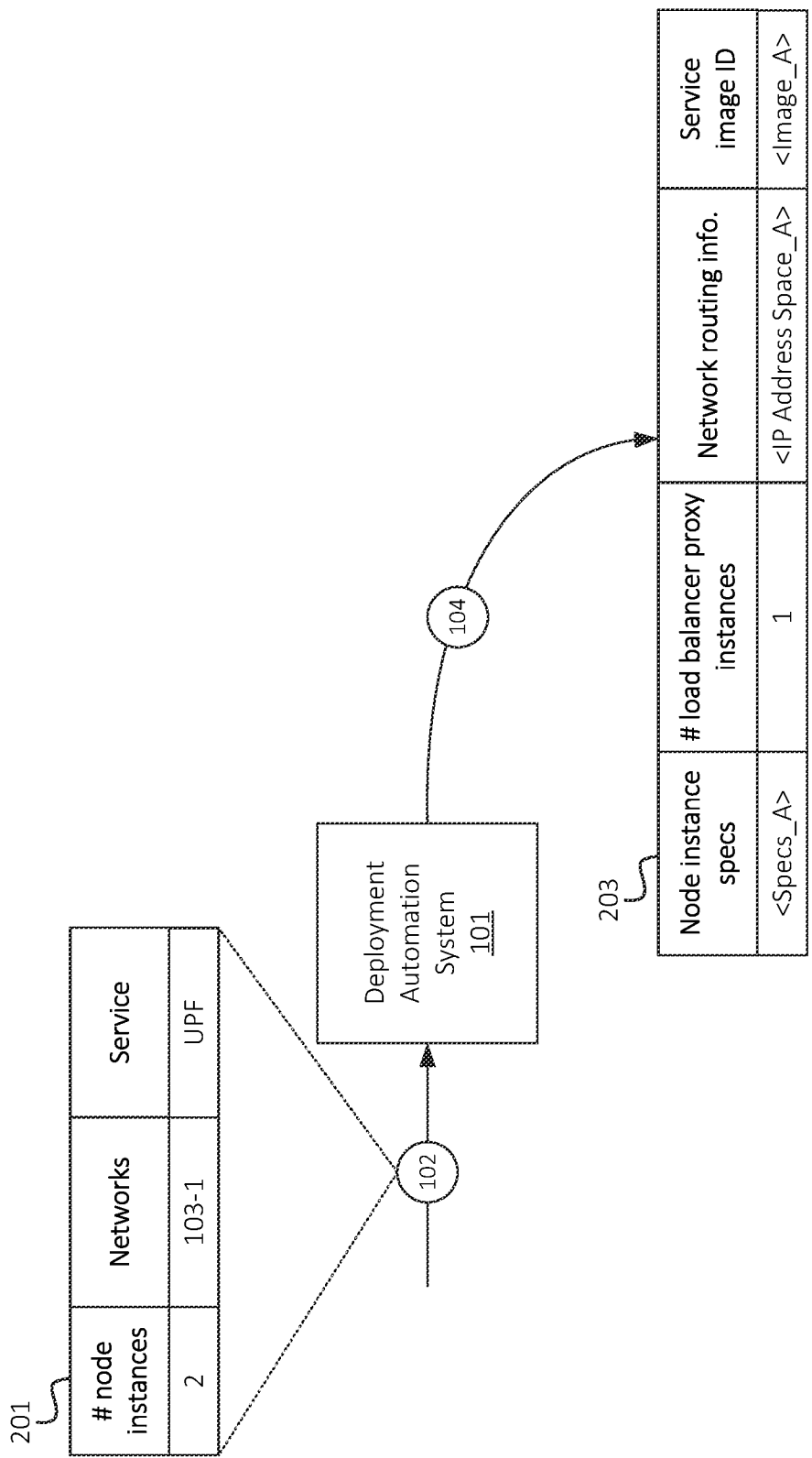
FIG. 2 illustrates an example of identifying deployment parameters for a requested load-balanced service based on parameters provided in the request, in accordance with some embodiments.

DMAS 101 may, based on the deployment request, determine (at 104) a set of deployment parameters. The deployment parameters may, as discussed below, include parameters that may be used to deploy, instantiate, etc. the requested node instances as well as one or more load balancers and/or routing proxies associated with the requested node instances. As shown in FIG. 2, for example, the deployment request may include and/or may be represented by example data structure 201. In this example, the deployment request indicates that a requested quantity of node instances is two, and that the node instances should be able to communicate with a particular network 103-1. In some embodiments, the deployment request may include one or more other parameters, such as a service type (e.g., a User Plane Function ("UPF"), in this example), a set of containers or images, and/or other parameters.

In some embodiments, data structure 201 may be provided in the form of, or in conjunction with, a custom resource definition ("CRD"), one or more codes, or the like. For example, a first CRD may indicate a first quantity of node instances and a first network (or set of networks), and a second CRD may indicate a second quantity of node instances and a second network (or set of networks). As another example, a first CRD may indicate a first service type, and a second CRD may indicate a second service type. In some embodiments, the deployment request may only specify some of the example information shown in FIG. 2 (e.g., may specify only a service type, may specify only a quantity of node instances, may specify only a quantity of node instances and one or more networks, etc.), and/or may specify different information.

Based on receiving (at 102) the deployment request, DMAS 101 may generate a set of deployment parameters, represented by data structure 203. Generally, the deployment parameters may include a set of parameters, instructions, etc. for implementing the requested quantity of node instances as well as one or more load balancers and/or routing proxies (herein referred to simply as "load balancer proxy nodes" or "load balancer proxies"). In this manner, the generation of the deployment parameters may eliminate the need for the requestor and/or some other entity to manually configure the requested multiple node instances as well as the load balancer proxies for the multiple node instances.

As shown, for example, data structure 203 may include specifications ("specs") for each requested node instance. The specifications for the particular set of requested node instances (represented as "<Specs_A>") may include, for example, hardware specifications such as a quantity or type of processor, an amount of memory resources, an amount of storage resources, etc. In some embodiments, the specifications for the particular set of requested node instances may include geographical parameters, such as a geographical location for each requested node instance, a datacenter at which each requested node instance is to be deployed, etc. In some embodiments, the specifications may include Quality of Service ("QoS") parameters, Service Level Agreements ("SLAs"), etc.

Data structure 203 may also include a quantity of load balancer proxy instances. The quantity of load balancer proxy instances may be based on, for example, different quantities of requested node instances, different quantities of networks, different service types, and/or other parameters. For example, a greater quantity of node instances may be associated with a greater level of expected demand, and a greater quantity of load balancer proxy instances may be identified based on the greater level of expected demand. As another example, a particular service type may be associated with a "mission-critical" or "high availability" category or label, and multiple load balancer proxy instances may be identified based on such category or label.

In some embodiments, data structure 203 may further include network routing information, which may include an address space (e.g., Internet Protocol ("IP") address space), subnet, address pool, etc.) associated with the specified network or networks 103. For example, one network 103 may be associated with 64 addresses of the format 1.2.3.xx (where "xx" is number from 0 to 63), while another network 103 may be associated with 65,536 addresses of the format 4.5.yy.zz (where "yy" and "zz" are each a number from 0 to 255). Generally, the network routing information may be "external" routing information, based on which the requested node instances may communicate with the requested network(s) 103.

Data structure 203 may also include an identifier of one or more images, containers, etc. For example, such images, containers, etc. may be maintained in a repository, a library, an image store, etc. and may be able to be installed on node instances in order to provide one or more particular services. In some embodiments, the identifier of the one or more images, containers, etc. may include a Helm Chart identifier. For example, a first image (e.g., "<Image_A>") may implement a UPF, while another image may implement another type of network function, such as a Session Management Function ("SMF"). In some embodiments, data structure 203 may include additional, less, and/or different information or parameters. For example, in some embodiments, data structure 203 may include a version number or other identifier of a particular load balancer proxy image or container, a network address space type (e.g., IP version 4, IP version 6, etc.), and/or other parameters.

In some embodiments, DMAS 101 may automatically determine some or all of the deployment parameters (e.g., as shown in data structure 203) based on the node and/or network parameters provided in the deployment request (e.g., as shown in data structure 201). For example, DMAS 101 may maintain a mapping between particular sets of deployment parameters and particular sets of requested node and/or network parameters. Additionally, or alternatively, DMAS 101 may utilize artificial intelligence/machine learning ("AI/ML") techniques in order to automatically identify some or all of the deployment parameters based on some or all of the requested node and/or network parameters.

Further, in some embodiments, one or more of the deployment parameters may be specified in the initial deployment request (at 102). For example, the deployment request may specify a quantity of load balance proxy instances, node instance specifications, etc. In some embodiments, the deployment request may include natural language requests and/or other unstructured data (e.g., "I want to deploy a load-balanced UPF with one instance in Florida and one instance in Maryland and I want each instance to be able to handle 10 GB/s of throughput"), and DMAS 101 may utilize Natural Language Processing ("NLP") and/or other suitable techniques to identify the node and/or network parameters and/or the deployment parameters based on the deployment request.

Returning to FIG. 1, DMAS 101 may output (at 106) the deployment request to orchestration system 105. In some embodiments, orchestration system 105 may be an orchestration system provided via the open source Kubernetes API or some other suitable type of containerized environment orchestration and/or management platform. Orchestration system 105 may accordingly have the capability to provision nodes, node instances, etc. on one or more sets of hardware resources 107. Hardware resources 107 may include, may be implemented by, etc. one or more cloud-based computing systems, one or more datacenters, one or more bare metal machines, one or more server racks, and/or other suitable types of devices or systems. In some embodiments, hardware resources 107 may be distributed geographically. Thus, while shown in FIG. 1 within a single box, in practice, hardware resources 107 may include multiple different discrete sets of hardware that are communicatively coupled to, and managed by, orchestration system 105.

Orchestration system 105 may authenticate the request and/or may verify that DMAS 101 is authorized to make the request. For example, DMAS 101 may have previously registered with orchestration system 105 in order to establish appropriate permissions, privileges, etc. to request the provisioning of node instances, load balance proxy nodes, and/or associated communication interfaces. For example, in some embodiments, DMAS 101 may have "root" or "elevated" privileges, permissions, etc. When making (at 106) the request, DMAS 101 may provide authentication information, such as one or more cryptographic keys, one or more authentication tokens, and/or other suitable authentication information, based on which orchestration system 105 may verify that the deployment request was received (at 106) from an authorized source. Such authentication information may have been provided by orchestration system 105 and/or some other suitable source during the registration of DMAS 101 with orchestration system 105.

As further shown, orchestration system 105 may deploy (at 108) the requested node instances as well as one or more load balancer proxies, such as by provisioning one or more nodes or node instances to implement load balancer proxy 109 and the requested node instances 111-1 and 111-2 (e.g., in the example where two node instances are requested). In some embodiments, provisioning load balancer proxy 109 and/or node instances 111 on hardware resources 107 may include allocating portions of hardware resources 107 (e.g., processing resources, memory resources, network resources, etc.) to implement load balancer proxy 109 and node instances 111. In some embodiments, orchestration system 105 may install, configure, instantiate, etc. one or more containers, images, etc. to implement load balancer proxy 109 and/or node instances 111. For example, orchestration system 105 may install one or more containers, images, etc. associated with load balancer proxy 109 on one or more nodes or node instances that implement load balancer proxy 109, and may install one or more containers, images, etc. associated with a requested service on node instances 111. In some embodiments, load balancer proxy 109 may be, may include, may be implemented by, or may implement a Service Proxy for Kubernetes ("SPK") or other suitable type of load balancer and/or routing proxy.

As discussed below, orchestration system 105 may also configure appropriate communication pathways between load balancer proxy 109 and node instances 111, such that load balancer proxy 109 may serve as an ingress and egress point for traffic between node instances 111 and the requested network (i.e., network 103-1, in this example). Load balancer proxy 109 may monitor performance metrics, load metrics, etc. associated with node instances 111, such that load balancer proxy 109 may perform load balancing, geographical location-based routing, and/or other suitable operations based on such monitoring. For example, load balancer proxy 109 may monitor load metrics associated with node instances 111-1 and 111-2, and provide ingress traffic (e.g., from network 103-1) to node instance 111-1 in situations where node instance 111-1 is less heavily loaded than node instance 111-2. Thus, based on the single request (at 102), a set of load-balanced node instances 111 may be provisioned, installed, and communicatively coupled to a requested network 103, without the need for manual performance of intermediate operations, such as establishing load balancer proxy 109 and/or routing configurations between load balancer proxy 109, network 103, and/or node instances 111.

Figure 3:
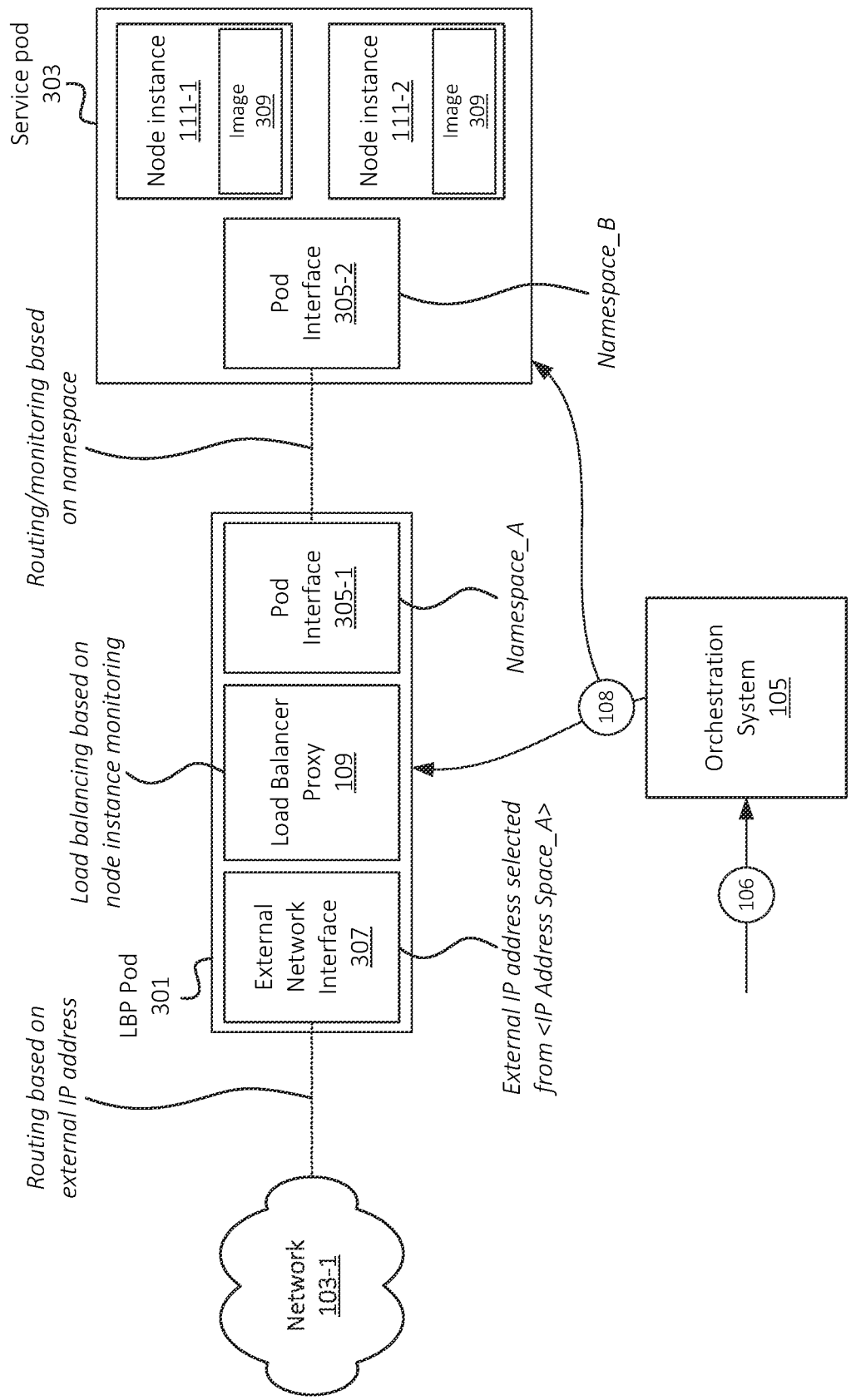
FIG. 3 illustrates an example of deploying a load-balanced service in response to a request, in accordance with some embodiments.

FIG. 3 illustrates a more detailed example of the provisioning and/or configuration of load balancer proxy 109 and node instances 111, in accordance with some embodiments. For example, in some embodiments, based on receiving (at 106) the deployment request with the deployment parameters, orchestration system 105 may configure (at 108) one or more pods, namespaces, etc. For example, orchestration system 105 may configure load balancer proxy pod 301 and service pod 303. Load balancer proxy pod 301 may be associated with a first namespace, a first domain, a first address pool, a first subnet, etc., while service pod 303 is associated with a second namespace, a second domain, a second address pool, a second subnet, etc. For example, load balancer proxy pod 301 may include a first pod interface 305-1, and service pod 303 may include a second pod interface 305-2. Pod interfaces 305-1 and 305-2 may also be referred to as virtual local area network ("VLAN") interfaces, private interfaces, internal interfaces, etc. Pod interfaces 305 may be implemented by way of routing tables, Border Gateway Protocol ("BGP") techniques, and/or other information maintained or provided by orchestration system 105, routers, switches, and/or other suitable elements. Pod interface 305-1 may be a gateway, entry point, visible interface, one or more addresses or other identifiers, etc. via which load balancer proxy pod 301 may communicate with other pods or namespaces, such as with service pod 303. Similarly, pod interface 305-2 may be a gateway, entry point, visible interface, one or more addresses or other identifiers, etc. via which service pod 303 may communicate with other pods or namespaces, such as with load balancer proxy pod 301.

In some embodiments, orchestration system 105 may maintain access and/or visibility information, such that certain pods and/or namespaces are accessible by each other, while other pods and/or namespaces are not accessible to one or more other pods and/or namespaces, thus maintaining separation and security as appropriate. For example, the deployment request may specify that load balancer proxy pod 301 and service pod 303 are authorized to communicate with each other, but are not authorized to communicate with (e.g., send traffic to and/or receive traffic from) other pods, nodes, etc.

In some embodiments, as discussed above, the deployment request may specify parameters associated with one or more external networks 103 with which the requested node instances 111 are able to communicate (i.e., network 103-1, in this example). For example, the deployment request may include an identifier of network 103-1, a particular address (e.g., an IP address) or set of candidate IP addresses (e.g., an IP address space or pool of IP addresses) associated with network 103-1, and/or other network parameters. The parameters may be provided as part of an instruction, command, request, etc. to establish external network interface 307 that is communicatively coupled to load balancer proxy 109 (e.g., included in load balancer proxy pod 301). External network interface 307 may, for example, be implemented by orchestration system 105 and/or one or more other routing elements, routing tables, BGP controllers, etc. Such implementations may include, for example, maintaining information associating load balancer proxy pod 301 and/or its associated namespace (e.g., Namespace_A) with one or more addresses (e.g., IP addresses) determined based on the parameters included in the deployment request (received at 106). The one or more addresses may be considered "external" with respect to orchestration system 105 and/or virtualization environments implemented by orchestration system 105 on hardware resources 107. In some embodiments, such implementations may include maintaining information associating external network interface 307 with one or more physical network interfaces, network interface cards ("NICs"), etc. of hardware resources 107. In this manner, load balancer proxy 109 (e.g., load balancer proxy pod 301) may be able to send and receive traffic to and/or from network 103-1 using the external address (e.g., where such external address refers to load balancer proxy pod 301).

In some embodiments, as discussed above, the deployment instruction may specify one or more images, containers, etc. to install, configure, etc. on the requested node instances 111. As shown, node instances 111-1 and 111-2 may both install image 309, which may include functionality, operations, processor-executable instructions, etc. to implement an operating system, one or more network functions, one or more applications, etc.

In some embodiments, orchestration system 105 may configure load balancer proxy 109 with addresses, names, and/or other identifiers of individual node instances 111. In this manner, load balancer proxy 109 may be "aware" of node instances 111, and may be able to communicate with individual node instances 111 (e.g., to receive monitoring information, to route traffic, etc.). In some embodiments, the deployment request may specify that load balancer proxy 109 (e.g., load balancer proxy pod 301) should monitor performance metrics, load metrics, and/or other suitable metrics or Key Performance Indicators ("KPIs") associated with service pod 303 (e.g., associated with individual node instances 111 of service pod 303).

Accordingly, orchestration system 105 may configure load balancer proxy 109 to request such information on a periodic, intermittent, or otherwise ongoing basis. Additionally, or alternatively, orchestration system 105 may configure node instances 111 to provide (e.g., "push") the information to load balancer proxy 109 (e.g., to load balancer proxy pod 301) on a periodic, intermittent, or otherwise ongoing basis. For example, orchestration system 105 may provide an identifier or indication (e.g., a namespace) of pod interface 305-1 to service pod 303 (e.g., node instances 111), via which node instances 111 may provide monitoring information to load balancer proxy 109. Additionally, or alternatively, orchestration system 105 may provide an identifier or indication of pod interface 305-2 to load balancer proxy pod 301 (e.g., load balancer proxy 109), via which load balancer proxy 109 may request monitoring information from service pod 303 (e.g., node instances 111). In some embodiments, one or more images 309 installed at respective node instances 111 may be configured to push monitoring information to load balancer proxy 109 (e.g., via pod interface 305-1), and/or one or more images installed at load balancer proxy 109 may be configured to request monitoring information from node instances 111 (e.g., via pod interface 305-2).

Figure 4:
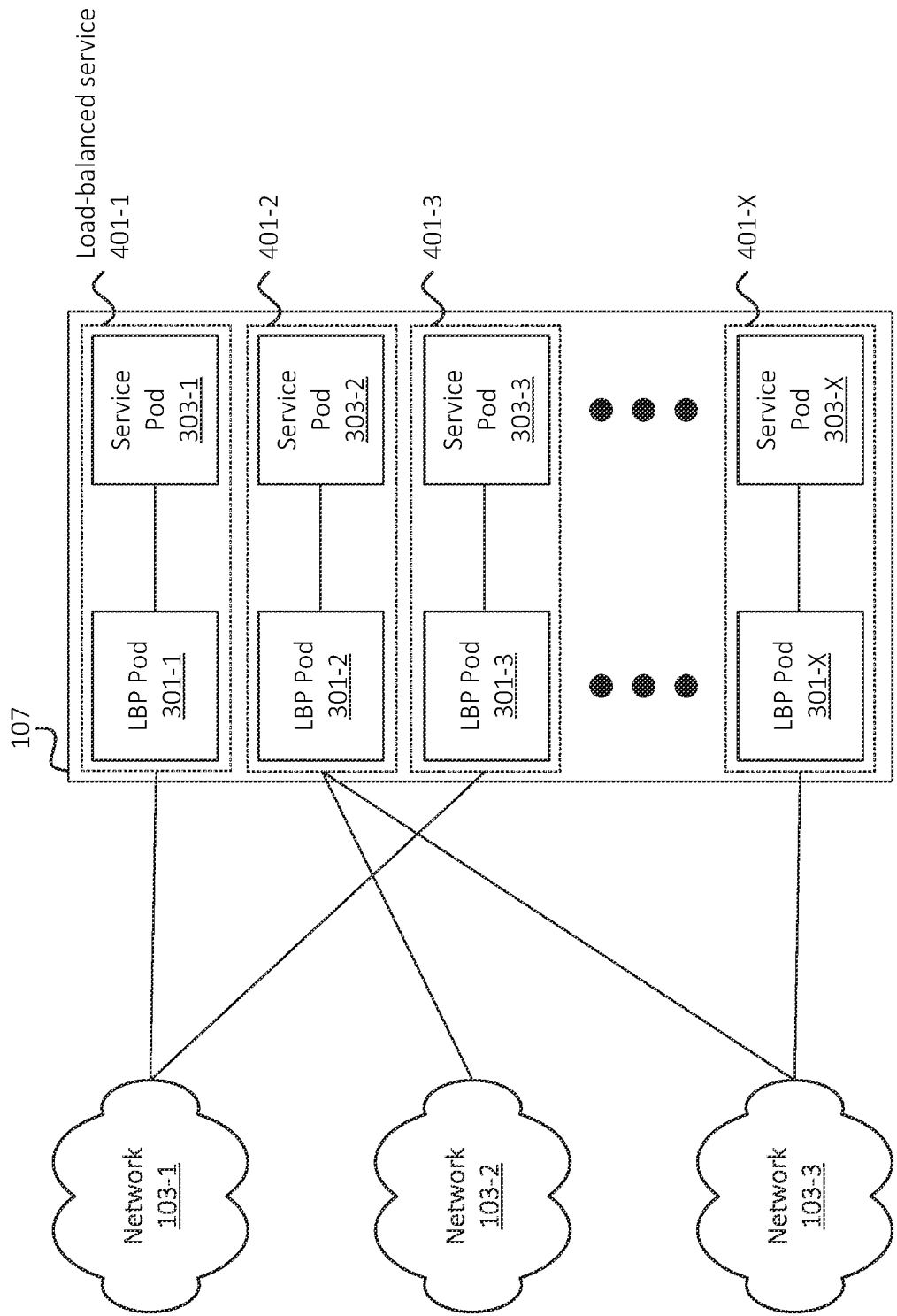
FIG. 4 illustrates an example of multiple load-balanced services deployed to a containerized environment, in accordance with some embodiments.

In this manner, as shown in FIG. 4, orchestration system 105 may receive multiple deployment requests from DMAS 101 and/or from some other source, and may implement multiple load-balanced services 401 based on such deployment requests. As shown, for example, load-balanced service 401-1 may include a first load balancer proxy pod 301-1 communicatively coupled to a first service pod 303-1, load-balanced service 401-2 may include a second load balancer proxy pod 301-2 communicatively coupled to a second service pod 303-2, load-balanced service 401-3 may include a third load balancer proxy pod 301-3 communicatively coupled to a third service pod 303-3, and so on. Each load-balanced service 401 may be connected to one or more different networks 103 in the manner described above. For example, node instances of service pod 303-1 may be able to communicate with network 103-1 via load balancer proxy pod 301-1, node instances of service pod 303-2 may be able to communicate with networks 103-2 and 103-3 via load balancer proxy pod 301-2, node instances of service pod 303-3 may be able to communicate with network 103-1 via load balancer proxy pod 301-3, and so on. As discussed above, due to access control associated with namespaces or other routing or separation mechanisms, pods (e.g., load balancer proxy pods 301 and/or service pods 303) of different load-balanced services 401 may not be able to communicate with each other or even be "aware" of each other's existence.

Figure 5A:
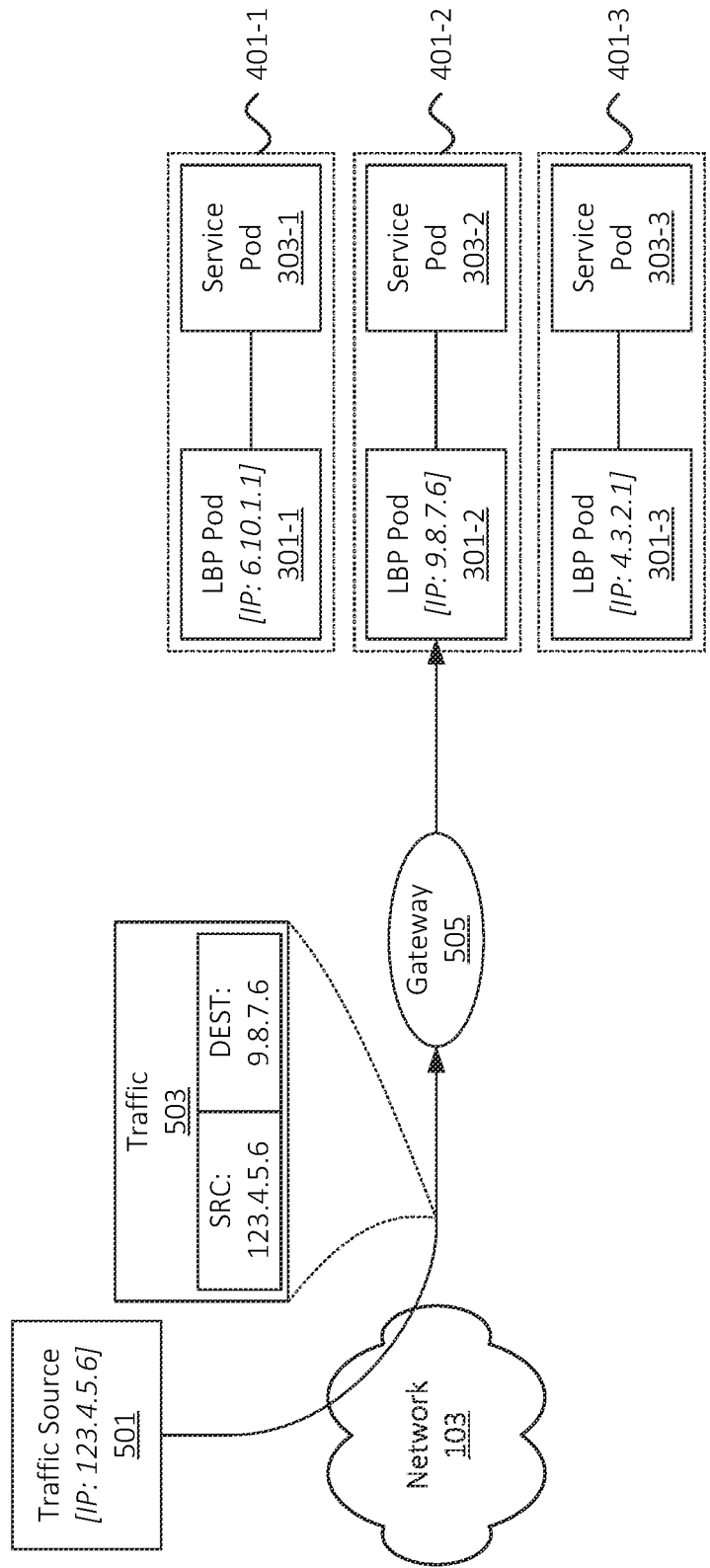
FIGS. 5A and 5B illustrate an example of routing ingress traffic associated with a particular load-balanced service generated based on a request, in accordance with some embodiments.
Figure 5B:
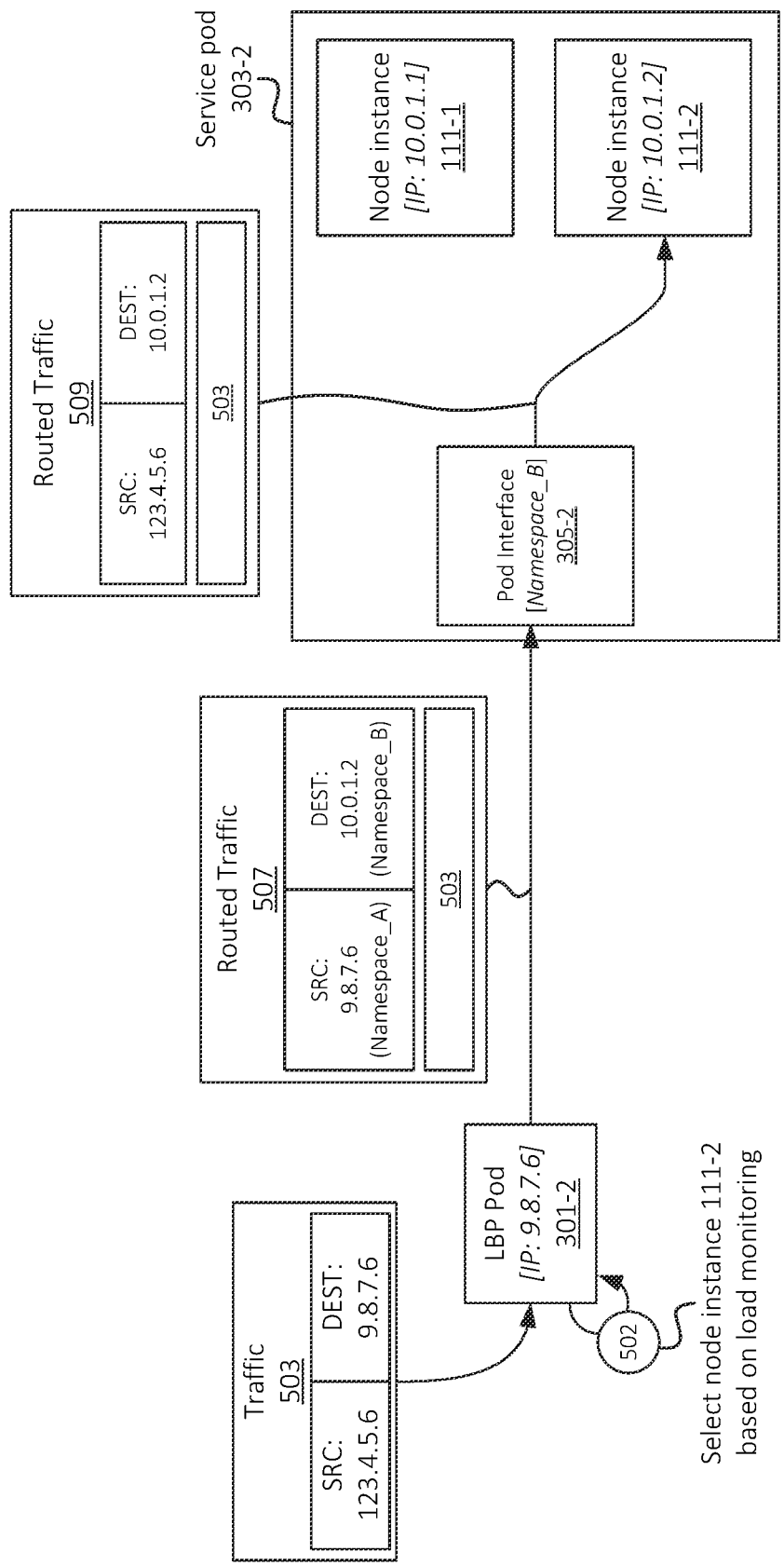

FIGS. 5A and 5B illustrate an example of ingress traffic being routed to a particular node instance 111, as selected by an associated load balancer proxy 109 of the same load-balanced service 401. As shown, for example, a particular traffic source 501, such as an application server, a content provider, a messaging server, a User Equipment ("UE"), and/or some other device or system, may output traffic 503 to load-balanced service 401-2. The traffic may be provided via a particular network 103. According to an address space utilized by network 103, an address (e.g., IP address) of traffic source 501 may be 123.4.5.6, and traffic 503 may accordingly specify (e.g., in header information) that a source of traffic 503 is 123.4.5.6. Traffic 503 may further specify that a destination of traffic 503 is 9.8.7.6. In this example, this address may be associated with load-balanced service 401-2. For example, when configuring load-balanced service 401-2, orchestration system 105 may have set an address of a respective external network interface 307, associated with load balancer proxy pod 301-2, to 9.8.7.6. Load-balanced services 401-1 and 401-3, in this example, may be reachable by external networks via other addresses (e.g., 6.10.1.1 and 4.3.2.1, respectively).

As shown, traffic 503 may be routed to load balancer proxy pod 301-2, based on the destination of the traffic specifying the address of external network interface 307 of load balancer proxy pod 301-2. Traffic 503 may be routed by one or more gateways 505 and/or other suitable routing elements associated with, configured by, etc. orchestration system 105. For example, as discussed above, gateway 505 may have been configured to route traffic, indicating a destination of 9.8.7.6, to load balancer proxy pod 301-2. Additionally, or alternatively, gateway 505 may have been configured with a mapping or correlation between 9.8.7.6 and a namespace or other routing mechanism associated with load balancer proxy pod 301-2.

Based on receiving traffic 503, load balancer proxy pod 301-2 may, as shown in FIG. 5B, select (at 502) a particular node instance 111, of associated service pod 303-2, to receive traffic 503. For example, as discussed above, load balancer proxy pod 301-2 may monitor load metrics, performance metrics, location, and/or other parameters of multiple node instances 111, and may select a particular node instance 111 (i.e., node instance 111-2, in this example) based on factors such as lowest amount of load, highest measure of performance, geographical proximity to a location associated with traffic 503 (e.g., a location associated with a source of traffic 503), and/or other suitable factors.

Load balancer proxy pod 301-2 may forward traffic 503 (shown as routed traffic 507) to pod interface 305-2 of service pod 303-2 based on the namespace associated with service pod 303-2 (e.g., Namespace_B). Routed traffic 507 may be an encapsulated version of traffic 503 (e.g., may include additional header information in addition to the header information of traffic 503), may be a newly structured packet or packet that includes some or all of the header information of traffic 503, may include traffic 503 with replacement header information, and/or may otherwise include or be based on traffic 503. In this example, routed traffic 507 may include header information indicating that a source of routed traffic 507 is load balancer proxy pod 301-2 (e.g., Namespace_A and/or an address of pod interface 305-2 associated with load balancer proxy pod 301-2). Setting the source of routed traffic 507 as load balancer proxy pod 301-2 may indicate, to routing elements associated with or configured by orchestration system 105, that routed traffic 507 is authorized to be routed to service pod 303-2, since load balancer proxy pod 301-2 and service pod 303-2 are authorized to communicate with each other (e.g., are associated with the same load-balanced service 401-2). In this manner, while routed traffic 507 may retain its original source information (i.e., 123.4.5.6, in this example), routed traffic 507 may be routed based on the encapsulated and/or added header information indicating the source as load balancer proxy pod 301-2.

Routed traffic 507 may also indicate an address of the particular selected (at 502) node instance 111-2 (i.e., 10.0.1.2, in this example) as a destination of routed traffic 507. In some embodiments, routed traffic 507 may include a namespace of service pod 303-2 as the destination of routed traffic 507. Additionally, or alternatively, one or more routing elements associated with or configured by orchestration system 105 may identify the namespace associated with the destination of routed traffic 507 based on an address space, subnet, etc. of the destination address of routed traffic 507. Based on the destination specified by routed traffic 507, the one or more routing elements may forward routed traffic 507 to service pod 303-2 (e.g., to pod interface 305-2).

Pod interface 305-2 may identify that a destination of routed traffic 507 or, ultimately, of original traffic 503 is node instance 111-2. For example, based on the destination specified in routed traffic 507, pod interface 305-2 may identify that node instance 111-2 is the destination of routed traffic 507. In some embodiments, pod interface 305-2 may further process, reformat, encapsulate, etc. routed traffic 507 as routed traffic 509. Routed traffic 509 may, for example, specify the original source (i.e., 123.4.5.6, in this example) as the source of routed traffic 509, and may specify node instance 111-2 as the destination. In some embodiments, routed traffic 509 may include some or all of original traffic 503, including some or all of the original header information. Additionally, or alternatively, routed traffic 509 may include a payload of traffic 503, and may include the original source header information specifying 123.4.5.6 as the source, but may include replacement destination header information specifying node instance 111-2 as the source of routed traffic 509.

Figure 6:
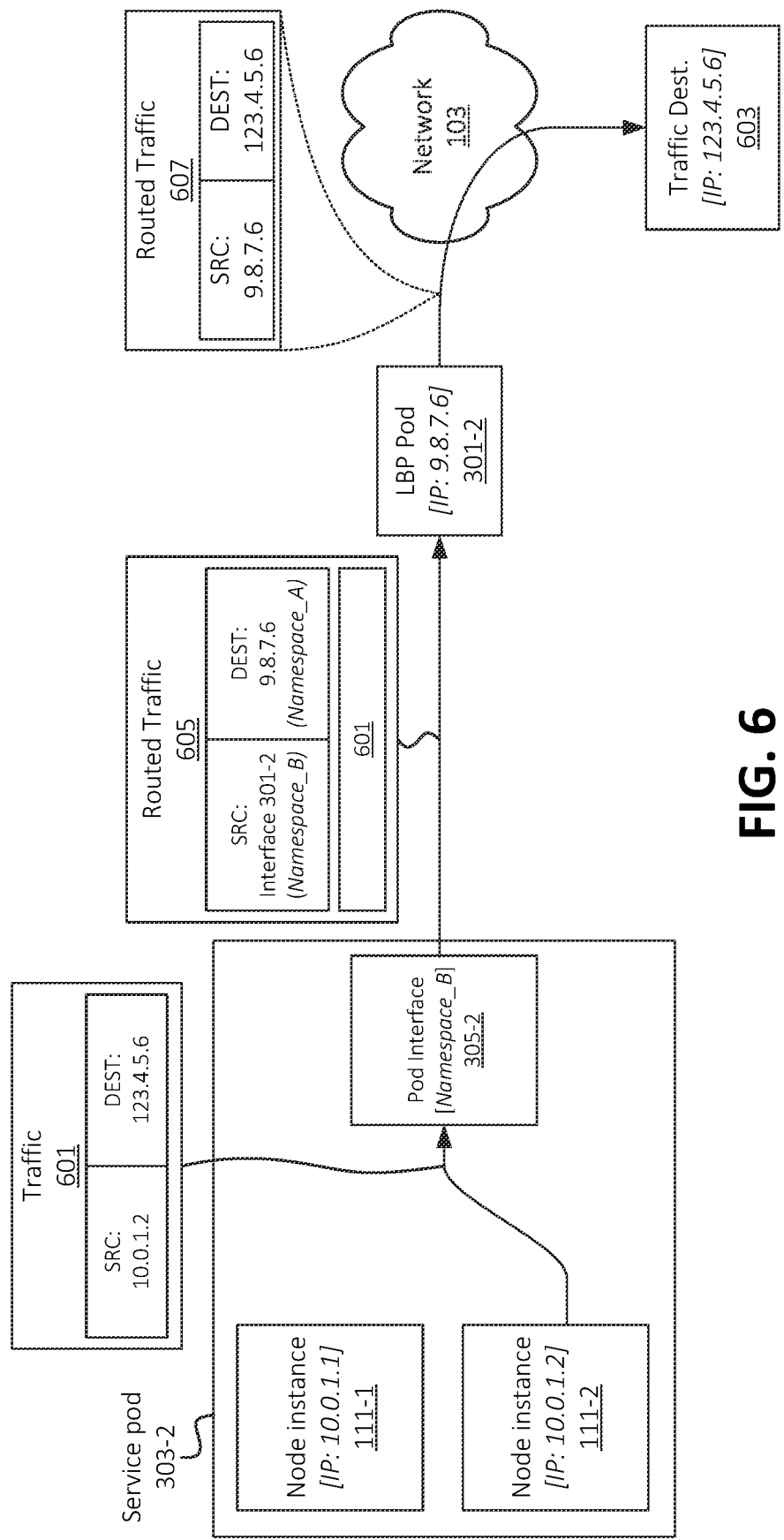
FIG. 6 illustrates an example of routing egress traffic associated with a particular load-balanced service generated based on a request, in accordance with some embodiments.

FIG. 6 illustrates an example of egress traffic being routed from a particular node instance 111 to a particular network 103. As shown, a particular node instance 111-2 may generate traffic 601 to be output to a given traffic destination 603 via a particular network 103. Node instance 111-2 may, for example, specify (e.g., in header information) an address, in an address space associated with network 103, of network 103 (i.e., an IP address of 123.4.5.6, in this example) for traffic 601. Traffic 601 may also indicate node instance 111-2 (e.g., an address of node instance 111-2) as a source of traffic 601. Node instance 111-2 may output traffic 601 via pod interface 305-2 of service pod 303-2. Pod interface 305-2 may encapsulate, reformat, repackage, etc. traffic 601 as routed traffic 605. As similarly discussed above, routed traffic 605 may include some or all of traffic 601, such as some or all of the header information of traffic 601, and/or a payload of traffic 601.

Routed traffic 605 may specify pod interface 305-2 and/or service pod 303-2 (e.g., an address of pod interface 305-2, a namespace of service pod 303-2, etc.) as a source of routed traffic 605. Routed traffic 605 may also specify load balancer proxy pod 301-2 (e.g., an address and/or namespace of load balancer proxy pod 301-2) as a destination of routed traffic 605. For example, pod interface 305-2 may identify that load balancer proxy pod 301-2 is an egress and/or gateway for traffic outputted from service pod 303-2 based on an association between service pod 303-2 and load balancer proxy pod 301-2. Additionally, or alternatively, one or more routing elements may receive routed traffic 605 and may forward routed traffic 605 to load balancer proxy pod 301-2 based on an association between service pod 303-2 and load balancer proxy pod 301-2 (e.g., as configured by orchestration system 105 based on a deployment instruction from DMAS 101, as discussed above). Routed traffic 605 may retain original destination information, such as in an encapsulated header and/or in some other suitable format. For example, while routed traffic 605 may be routed to load balancer proxy pod 301-2 based on destination information specifying the address of pod interface 305-2 and/or namespace of load balancer proxy pod 301-2, routed traffic 605 may retain the original destination information (e.g., the address of traffic destination 603 according to a network space of network 103).

Load balancer proxy pod 301-2 may receive routed traffic 605, and may identify the original destination of traffic 601. Routed traffic 605 may generate further routed traffic 607 based on routed traffic 605 and/or traffic 601. Routed traffic 607 may include an original payload of traffic 601 and the original destination of traffic 601. Routed traffic 607 may further specify a source of routed traffic 607 as load balancer proxy pod 301-2 (e.g., an address of external network interface 307 of load balancer proxy pod 301-2). Load balancer proxy pod 301-2 may output routed traffic 607 to traffic destination 603 via network 103 and/or one or more other devices, systems, or networks (e.g., via gateway 505, one or more routing elements, etc.).

In this manner, from the standpoint of devices communicatively coupled to network 103 (e.g., traffic source 501 and/or traffic destination 603), such devices may communicate with a given load-balanced service 401 via an external address associated with a respective external network interface 307 of a respective load balancer proxy pod 301 of the given load-balanced service 401. A respective set of node instances 111 that implement a service, application, etc. may accordingly communicate with traffic source 501 and/or traffic destination 603 to provide communications related to such service, application, etc. Since node instances 111 communicate with traffic source 501 and/or traffic destination 603 via a respective load balancer proxy pod 301, load balancing and/or egress routing services may be provided by such load balancer proxy pod 301, such that the service is provided in an optimal manner. Additionally, since embodiments described above configure load-balanced services 401 based on a single request (e.g., at 102) from an entity, the entity need not perform additional operations and/or communicate with other entities to instantiate, provision, configure, etc. such load-balanced services 401.

Figure 7:
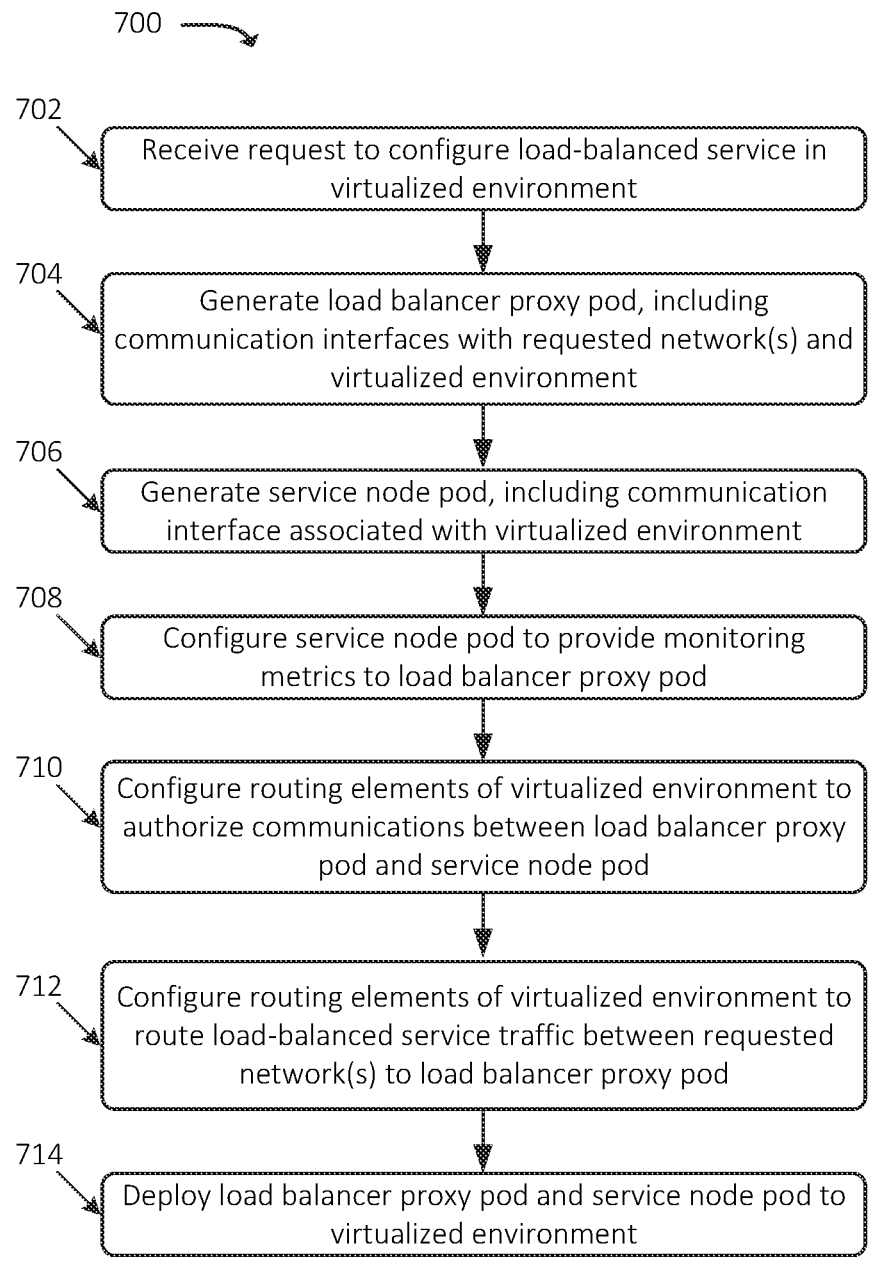
FIG. 7 illustrates an example process for deploying a load-balanced service in response to a request, in accordance with some embodiments.

FIG. 7 illustrates an example process 700 for deploying a load-balanced service in a containerized environment in response to a request. For the sake of clarity, process 700 is described below as being performed by DMAS 101. In some embodiments, one or more other devices may perform some or all of process 700 in concert with, and/or in lieu of, DMAS 101, such as orchestration system 105 and/or one or more routing elements of a containerized environment with which DMAS 101 and/or orchestration system 105 are associated.

As shown, process 700 may include receiving (at 702) a request to configure a load-balanced service in a containerized environment. For example, DMAS 101 may receive the request via an API, web portal, or the like. DMAS 101 may authenticate the request, and/or determine whether the request is authorized (e.g., based on an identity and/or authentication information associated with the requestor). The load-balanced service request may, in some embodiments, include a flag, label, indicator, identifier, etc. indicating that the request is for a load-balanced service, rather than being some other type of request. As discussed above, the request may include one or more parameters, such as a quantity of node instances being requested to implement the service (referred to as "service node instances" or collectively as "service node"), a quantity of instances of load balancer proxy nodes (referred to as "load balancer proxy node instances" or collectively as "load balancer proxy node") to provide load balancing and/or routing services for the service node instances, one or more networks with which the service node should communicate, and/or other suitable parameters. In some embodiments, DMAS 101 may identify one or more additional parameters based on the requested parameters, such as by performing a lookup in a lookup table, utilizing AI/ML techniques to identify additional parameters, utilizing NLP techniques to identify parameters included in the request, etc.

Process 700 may further include generating (at 704) a load balancer proxy pod, including communication interfaces with the requested network(s) and the containerized environment. For example, DMAS 101 may generate or configure a set of instances of a load balancer proxy node, which may include one instance of the load balancer proxy node or multiple instances, based on parameters specified in the request and/or otherwise identified by DMAS 101. The load balancer proxy pod may be associated with the same namespace, domain, subnet, etc. As such, one or more elements of the load balancer proxy pod may be "visible" or accessible to one or more other elements of the load balancer proxy pod.

DMAS 101 may configure the load balancer proxy pod with an interface to the network or networks specified in the request. For example, DMAS 101 may associate the load balancer proxy pod with an IP address or other type of address or identifier that is compatible with the requested network or networks. For example, DMAS 101 may identify an address space associated with a particular requested network, and may select a particular address, such as an available address in a pool of addresses associated with the address space. DMAS 101 may assign the selected particular address to the load balancer proxy pod, inasmuch as the interface between the particular network and the load balancer proxy pod may include and/or may otherwise be associated with the selected address.

DMAS 101 may also configure the load balancer proxy pod with an interface associated with the containerized environment. For example, DMAS 101 may associate the load balancer proxy pod with a particular namespace, domain, or other identifier that is used for routing communications between different elements (e.g., pods) of the containerized environment.

Process 700 may additionally include generating (at 706) a service node pod, including a communication interface associated with the containerized environment. For example, DMAS 101 may generate or configure a set of instances of a service node. As discussed above, parameters or specifications of the service node instances may be included in the request and/or may otherwise be identified by DMAS 101, such as quantity of nodes, hardware resource allocations, etc. The service node pod may be associated with the same namespace, domain, subnet, etc. As such, one or more elements of the service node pod may be "visible" or accessible to one or more other elements of the service node pod.

DMAS 101 may also configure the service node pod with an interface associated with the containerized environment. For example, DMAS 101 may associate the service node pod with a particular namespace, domain, or other identifier that is used for routing communications between different elements (e.g., pods) of the containerized environment. This namespace, domain, etc. may be different than the one selected (at 704) for the load balancer proxy pod.

Process 700 may also include configuring (at 708) the service node pod to provide monitoring metrics to the load balancer proxy pod. For example, DMAS 101 may provide instructions, install one or more images or applications, etc. that instruct the service node pod to provide metrics, associated with individual service node instances of the service node pod, to the load balancer proxy pod. In some embodiments, DMAS 101 may provide the namespace, domain, address, etc. of the load balancer proxy pod to the service node pod, based on which the service node pod may provide the monitored information. Additionally, or alternatively, DMAS 101 may provide the namespace, domain, address, etc. of the service node pod to the load balancer proxy pod, based on which the load balancer proxy pod may request the monitored information.

Process 700 may further include configuring (at 710) routing elements of the containerized environment to authorize communications between the load balance proxy pod and the service node pod. For example, DMAS 101 may configure one or more routers, gateways, etc. of the containerized environment to indicate that the load balancer proxy pod and the service node pod are authorized to communicate (e.g., traffic specifying the namespace of the load balancer proxy pod as a source and the namespace of the service node pod should be allowed to be forwarded to the service node pod, and vice versa). Additionally, or alternatively, DMAS 101 may configure the routing elements of the containerized environment to restrict, not authorize, etc. communications associated with other namespaces from being forwarded to the load balancer proxy pod and/or the service node pod.

Process 700 may additionally include configuring (at 712) routing elements of the containerized environment to route load-balanced service traffic between the network(s) and the load balancer proxy pod. For example, DMAS 101 may configure routing elements of the containerized environment to forward traffic, directed to the address (e.g., the external IP address) associated with the interface between the load balancer proxy pod and the particular network, to the load balancer proxy pod. Similarly, DMAS 101 may configure routing elements of the containerized environment to forward traffic, received from the load balancer proxy pod and directed to an address associated with the particular network, to the particular network. As discussed above, communications received from the load balancer proxy pod may have been provided by the service node pod (e.g., by a particular service node instance), and communications directed to the load balancer proxy pod may ultimately be provided (e.g., based on load balancing or other operations) to a particular service node instance by the load balancer proxy pod.

Process 700 may also include deploying (at 714) the load balancer proxy pod and the service node pod to the containerized environment. For example, DMAS 101 may provision one or more sets of hardware resources associated with the containerized environment to implement the respective load balancer proxy node instances and/or the service node instances, as well as configuring routing tables and/or other routing mechanisms of the containerized environment in accordance with the above-described operations. Once deployed, the load balancer proxy pod may serve as an egress point for traffic from the service node pod to the particular requested network or networks, and may serve as a load-balancing ingress point for traffic from the requested network or networks to the service node pod.

Figure 8:
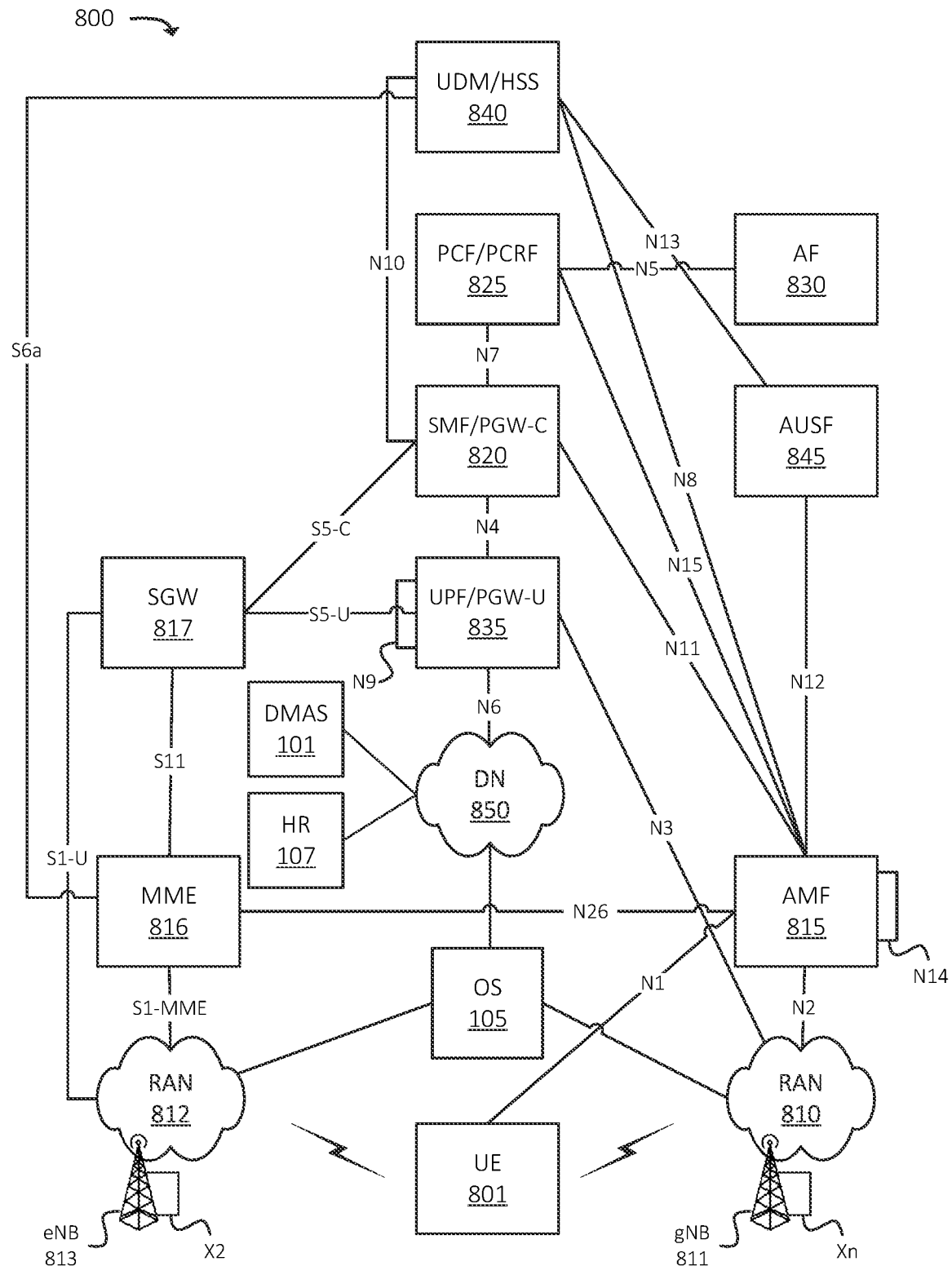
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long- Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include UE 801, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Unified Data Management ("UDM")/Home Subscriber Server ("HSS") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as DMAS 101, orchestration system 105, and/or hardware resources 107.

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF/PGW-C 820, PCF/PCRF 825, UPF/PGW-U 835, UDM/HSS 840, and/or AUSF 845, while another slice may include a second instance of SMF/PGW-C 820, PCF/PCRF 825, UPF/PGW-U 835, UDM/HSS 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800. Further, some or all of environment 800 may be implemented as a containerized environment, in which one or more elements of environment 800 may be implemented by one or more nodes, node instances 111, load-balanced services 401, etc.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N2 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 8, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 800 may be, may include, may be implemented by, and/or may be communicatively coupled to network 103 and/or one or more other networks.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 801 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., user plane traffic such as voice call traffic, data traffic, messaging traffic, etc.) from UE 801 via the air interface, and may communicate the traffic to UPF/PGW-U 835 and/or one or more other devices or networks. Further, RAN 810 may receive signaling traffic, control plane traffic, etc. from UE 801 via the air interface, and may communicate such signaling traffic, control plane traffic, etc. to AMF 815 and/or one or more other devices or networks. Additionally, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 801 via the air interface, and may communicate the traffic to UPF/PGW-U 835 (e.g., via SGW 817) and/or one or more other devices or networks. Further, RAN 812 may receive signaling traffic, control plane traffic, etc. from UE 801 via the air interface, and may communicate such signaling traffic, control plane traffic, etc. to MME 816 and/or one or more other devices or networks. Additionally, RAN 812 may receive traffic intended for UE 801 (e.g., from UPF/PGW-U 835, MME 816, SGW 817, and/or one or more other devices or networks) and may communicate the traffic to UE 801 via the air interface.

AMF 815 may include one or more devices, systems, Virtualized Network Functions ("VNFs"), Cloud-Native Network Functions ("CNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, RAN 812, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 801.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

Figure 9:
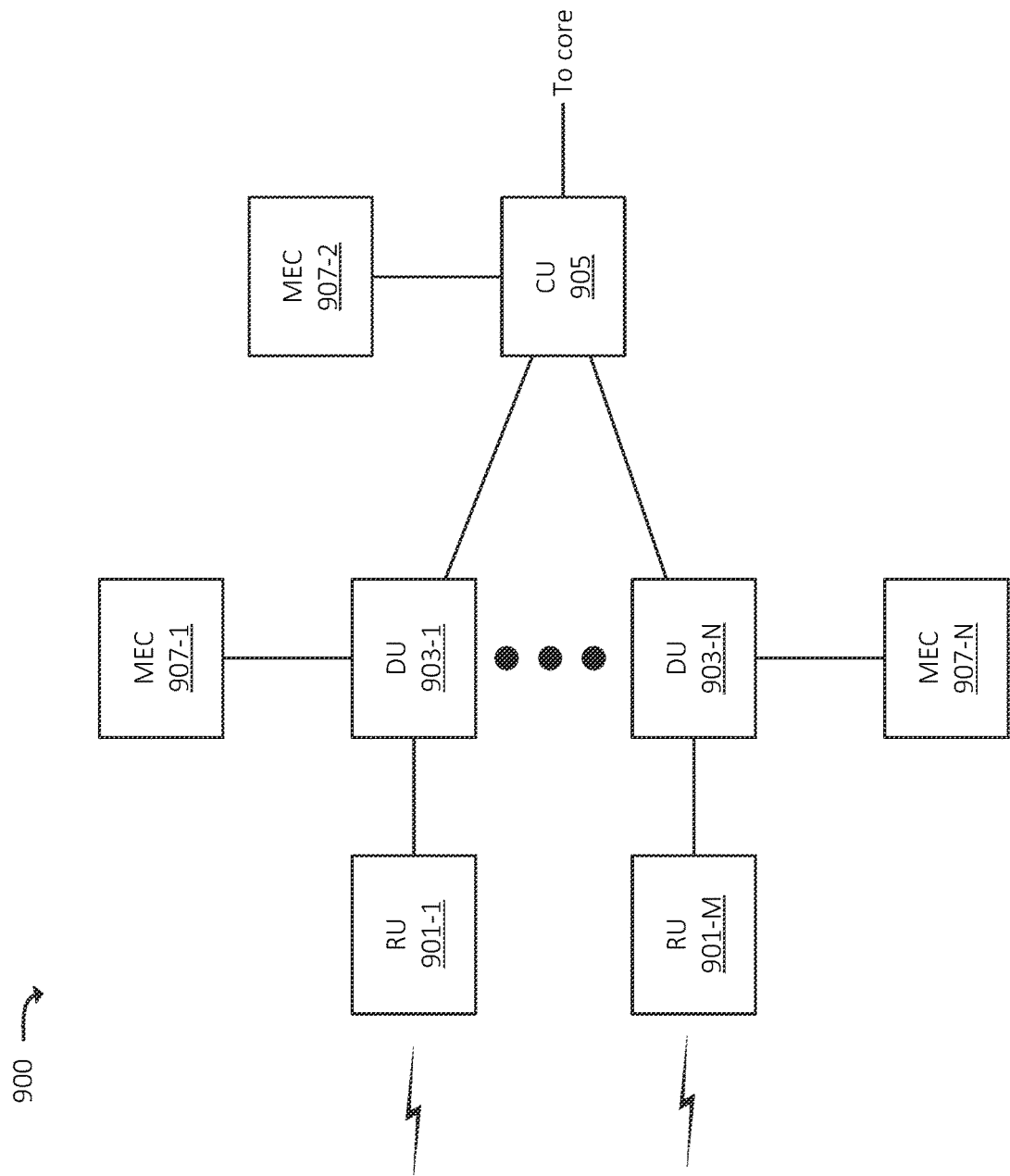
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 810, RAN 812, or some other RAN). In some embodiments, a particular RAN may include one RAN environment 900. In some embodiments, a particular RAN may include multiple RAN environments 900. In some embodiments, RAN environment 900 may correspond to a particular gNB 811 of a 5G RAN (e.g., RAN 810). In some embodiments, RAN environment 900 may correspond to multiple gNBs 811. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/ aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

One or more elements of RAN environment 900 may, in some embodiments, be communicatively coupled to one or more Multi-Access/Mobile Edge Computing ("MEC") devices, referred to sometimes herein simply as "MECs" 907. For example, DU 903-1 may be communicatively coupled to MEC 907-1, DU 903-N may be communicatively coupled to MEC 907-N, CU 905 may be communicatively coupled to MEC 907-2, and so on. MECs 907 may include hardware resources (e.g., configurable or provisionable hardware resources) that may be configured to provide services and/or otherwise process traffic to and/or from UE 801, via a respective RU 901.

For example, DU 903-1 may route some traffic, from UE 801, to MEC 907-1 instead of to a core network via CU 905. MEC 907-1 may process the traffic, perform one or more computations based on the received traffic, and may provide traffic to UE 801 via RU 901-1. In some embodiments, MEC 907 may include, and/or may implement, some or all of the functionality described above with respect to AF 830, UPF 835, and/or one or more other devices, systems, VNFs, CNFs, etc. In this manner, ultra-low latency services may be provided to UE 801, as traffic does not need to traverse DU 903, CU 905, links between DU 903 and CU 905, and an intervening backhaul network between RAN environment 900 and the core network.

Figure 10:
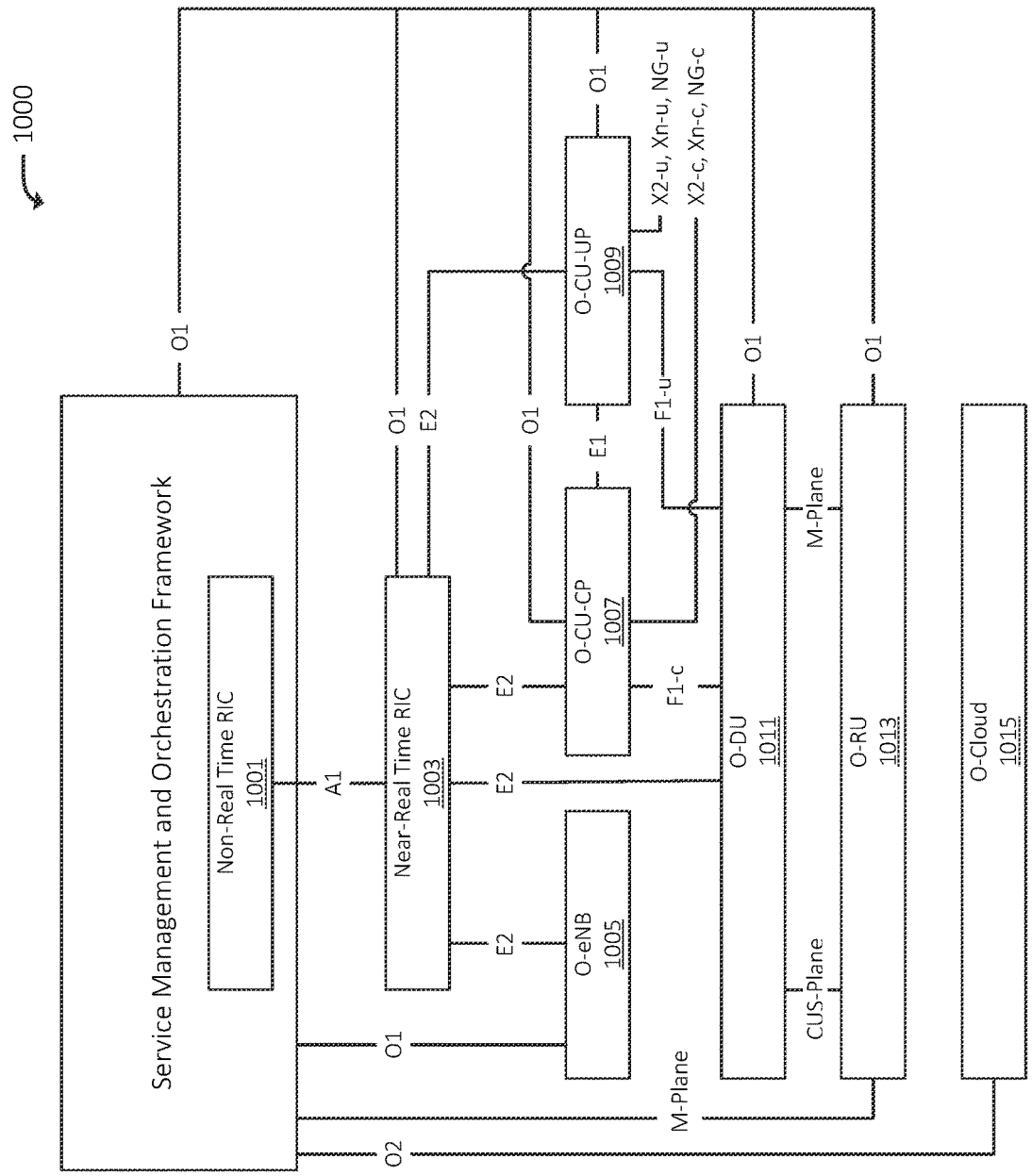
FIG. 10 illustrates an example arrangement of an Open RAN ("O-RAN") environment in which one or more embodiments, described herein, may be implemented.

FIG. 10 illustrates an example O-RAN environment 1000, which may correspond to RAN 810, RAN 812, and/or DU network 900. For example, RAN 810, RAN 812, and/or DU network 900 may include one or more instances of O-RAN environment 1000, and/or one or more instances of O-RAN environment 1000 may implement RAN 810, RAN 812, DU network 900, and/or some portion thereof. As shown, O-RAN environment 1000 may include Non-Real Time Radio Intelligent Controller ("RIC") 1001, Near-Real Time RIC 1003, O-eNB 1005, O-CU-Control Plane ("O-CU-CP") 1007, O-CU-User Plane ("O-CU-UP") 1009, O-DU 1011, O-RU 1013, and O-Cloud 1015. In some embodiments, O-RAN environment 1000 may include additional, fewer, different, and/or differently arranged components. In some embodiments, one or more of the elements of O-RAN environment 1000 may be implemented as one or more nodes, node instances 111, and/or load-balanced services 401.

In some embodiments, some or all of the elements of O-RAN environment 1000 may be implemented by one or more configurable or provisionable resources, such as virtual machines, cloud computing systems, physical servers, and/or other types of configurable or provisionable resources. In some embodiments, some or all of O-RAN environment 1000 may be implemented by, and/or communicatively coupled to, one or more MECs 907.

Non-Real Time RIC 1001 and Near-Real Time RIC 1003 may receive performance information (and/or other types of information) from one or more sources, and may configure other elements of O-RAN environment 1000 based on such performance or other information. For example, Near-Real Time RIC 1003 may receive performance information, via one or more E2 interfaces, from O-eNB 1005, O-CU-CP 1007, and/or O-CU-UP 1009, and may modify parameters associated with O-eNB 1005, O-CU-CP 1007, and/or O-CU-UP 1009 based on such performance information. Similarly, Non-Real Time RIC 1001 may receive performance information associated with O-eNB 1005, O-CU-CP 1007, O-CU-UP 1009, and/or one or more other elements of O-RAN environment 1000 and may utilize machine learning and/or other higher level computing or processing to determine modifications to the configuration of O-eNB 1005, O-CU-CP 1007, O-CU-UP 1009, and/or other elements of O-RAN environment 1000. In some embodiments, Non-Real Time RIC 1001 may generate machine learning models based on performance information associated with O-RAN environment 1000 or other sources, and may provide such models to Near-Real Time RIC 1003 for implementation.

O-eNB 1005 may perform functions similar to those described above with respect to eNB 813. For example, O-eNB 1005 may facilitate wireless communications between UE 1 uu and a core network. O-CU-CP 1007 may perform control plane signaling to coordinate the aggregation and/or distribution of traffic via one or more DUs 903, which may include and/or be implemented by one or more O-DUs 1011, and O-CU-UP 1009 may perform the aggregation and/or distribution of traffic via such DUs 903 (e.g., O-DUs 1011). O-DU 1011 may be communicatively coupled to one or more RUs 901, which may include and/or may be implemented by one or more O-RUs 1013. In some embodiments, O-Cloud 1015 may include or be implemented by one or more MECs 907, which may provide services, and may be communicatively coupled, to O-CU-CP 1007, O-CU-UP 1009, O-DU 1011, and/or O-RU 1013 (e.g., via an O1 and/or O2 interface).

Figure 11:
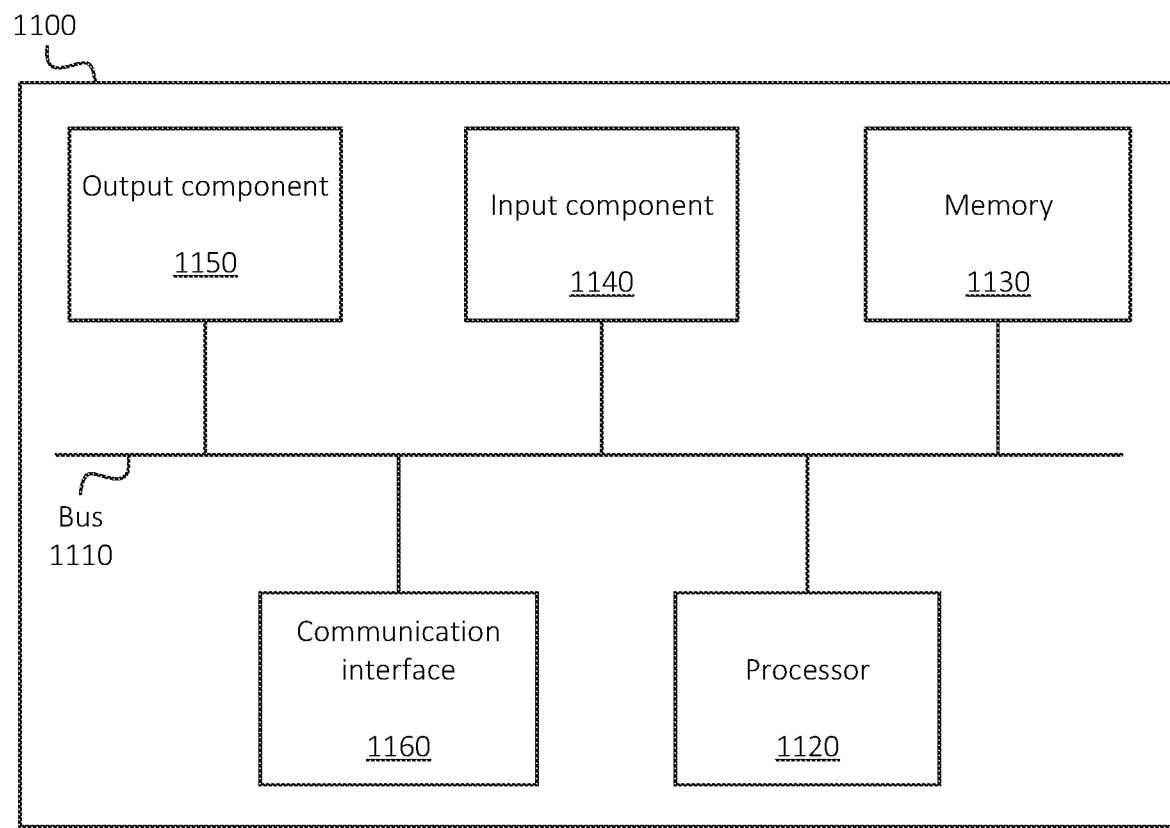
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to input component 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a request to configure a load-balanced service in a containerized environment, wherein the request includes an indication of a particular network with which the load-balanced service is to communicate;
generate, based on the request, a set of load balancer proxy node instances, wherein generating the set of load balancer proxy node instances includes:
associating the set of load balancer proxy node instances with a first interface associated with the particular network, and associating the set of load balancer proxy node instances with a second interface associated with the containerized environment;

generate, based on the request, a set of service node instances, wherein generating the set of service node instances includes associating the set of service node instances with a third interface associated with the containerized environment;

associate the second interface, of the set of load balancer proxy node instances, with the third interface of the set of service node instances; and deploy, in response to the request to configure the load-balanced service, the set of load balancer proxy node instances and the set of service node instances to the containerized environment.

2. The device of claim 1, wherein the set of load balancer proxy node instances serves as an egress point for traffic, originating from the set of service node instances, to the particular network.

3. The device of claim 1, wherein the set of load balancer proxy node instances serve as an ingress point for traffic, associated with the load-balanced service, received from the particular network.

4. The device of claim 3, wherein the set of load balancer proxy node instances monitor metrics associated with the set of service node instances, wherein the set of load balancer proxy node instances select a particular service node instance, of the set of service node instances, to receive the traffic based on the monitored metrics.

5. The device of claim 1, wherein the request further includes an indication of a service type, wherein the one or more processors are further configured to:
 select one or more images out of a plurality of images based on the service type; and
 install the selected one or more images on each service node instance of the set of service node instances.

6. The device of claim 1, wherein the one or more processors are further configured to:
 identify an address space associated with the particular network, wherein associating the set of load balancer proxy node instances with the first interface with the particular network includes:
  selecting a particular address from the address space associated with the particular network, and
  assigning the particular address to the set of load balancer proxy node instances.

7. The device of claim 1, wherein associating the set of load balancer proxy node instances with the second interface and associating the set of service node instances with the third interface includes:
 associating the set of load balancer proxy node instances with a first namespace of the containerized environment,
 associating the set of service node instances with a second namespace of the containerized environment, and
 configuring one or more routing elements of the containerized environment to indicate that the first and second namespaces are authorized to communicate with each other via the one or more routing elements.

8. A non-transitory computer-readable medium, storing a plurality of processor-executable instructions to:
 receive a request to configure a load-balanced service in a containerized environment, wherein the request includes an indication of a particular network with which the load-balanced service is to communicate;

generate, based on the request, a set of load balancer proxy node instances, wherein generating the set of load balancer proxy node instances includes:
 associating the set of load balancer proxy node instances with a first interface associated with the particular network, and
 associating the set of load balancer proxy node instances with a second interface associated with the containerized environment;

generate, based on the request, a set of service node instances, wherein generating the set of service node instances includes associating the set of service node instances with a third interface associated with the containerized environment;

associate the second interface, of the set of load balancer proxy node instances, with the third interface of the set of service node instances; and deploy, in response to the request to configure the load-balanced service, the set of load balancer proxy node instances and the set of service node instances to the containerized environment.

9. The non-transitory computer-readable medium of claim 8, wherein the set of load balancer proxy node instances serves as an egress point for traffic, originating from the set of service node instances, to the particular network.

10. The non-transitory computer-readable medium of claim 8, wherein the set of load balancer proxy node instances serve as an ingress point for traffic, associated with the load-balanced service, received from the particular network.

11. The non-transitory computer-readable medium of claim 10, wherein the set of load balancer proxy node instances monitor metrics associated with the set of service node instances, wherein the set of load balancer proxy node instances select a particular service node instance, of the set of service node instances, to receive the traffic based on the monitored metrics.

12. The non-transitory computer-readable medium of claim 8, wherein the request further includes an indication of a service type, wherein the plurality of processor-executable instructions further include processor-executable instructions to:
 select one or more images out of a plurality of images based on the service type; and
 install the selected one or more images on each service node instance of the set of service node instances.

13. The non-transitory computer-readable medium of claim 8, wherein the plurality of processor-executable instructions further include processor-executable instructions to:
 identify an address space associated with the particular network, wherein associating the set of load balancer proxy node instances with the first interface with the particular network includes:
  selecting a particular address from the address space associated with the particular network, and
  assigning the particular address to the set of load balancer proxy node instances.

14. The non-transitory computer-readable medium of claim 8, wherein associating the set of load balancer proxy node instances with the second interface and associating the set of service node instances with the third interface includes:
 associating the set of load balancer proxy node instances with a first namespace of the containerized environment, associating the set of service node instances with a second namespace of the containerized environment, and configuring one or more routing elements of the containerized environment to indicate that the first and second namespaces are authorized to communicate with each other via the one or more routing elements.

15. A method, comprising:

receiving a request to configure a load-balanced service in a containerized environment, wherein the request includes an indication of a particular network with which the load-balanced service is to communicate;

generating, based on the request, a set of load balancer proxy node instances, wherein generating the set of load balancer proxy node instances includes:

associating the set of load balancer proxy node instances with a first interface associated with the particular network, and associating the set of load balancer proxy node instances with a second interface associated with the containerized environment;

generating, based on the request, a set of service node instances, wherein generating the set of service node instances includes associating the set of service node instances with a third interface associated with the containerized environment;

associating the second interface, of the set of load balancer proxy node instances, with the third interface of the set of service node instances; and deploying, in response to the request to configure the load-balanced service, the set of load balancer proxy node instances and the set of service node instances to the containerized environment.

16. The method of claim 15, wherein the set of load balancer proxy node instances serves as an egress point for traffic, originating from the set of service node instances, to the particular network.

17. The method of claim 15, wherein the set of load balancer proxy node instances serve as an ingress point for traffic, associated with the load-balanced service, received from the particular network, wherein the set of load balancer proxy node instances monitor metrics associated with the set of service node instances, wherein the set of load balancer proxy node instances select a particular service node instance, of the set of service node instances, to receive the traffic based on the monitored metrics.

18. The method of claim 15, wherein the request further includes an indication of a service type, the method further comprising:

selecting one or more images out of a plurality of images based on the service type; and installing the selected one or more images on each service node instance of the set of service node instances.

19. The method of claim 15, further comprising:

identifying an address space associated with the particular network, wherein associating the set of load balancer proxy node instances with the first interface with the particular network includes:

selecting a particular address from the address space associated with the particular network, and assigning the particular address to the set of load balancer proxy node instances.

20. The method of claim 15, wherein associating the set of load balancer proxy node instances with the second interface and associating the set of service node instances with the third interface includes:

associating the set of load balancer proxy node instances with a first namespace of the containerized environment, associating the set of service node instances with a second namespace of the containerized environment, and configuring one or more routing elements of the containerized environment to indicate that the first and second namespaces are authorized to communicate with each other via the one or more routing elements.

* * * * *